United States Patent
Crockett et al.

(10) Patent No.: US 8,578,046 B2
(45) Date of Patent: Nov. 5, 2013

(54) SYSTEM AND METHOD FOR ADAPTIVE MEDIA BUNDLING FOR VOICE OVER INTERNET PROTOCOL APPLICATIONS

(75) Inventors: Douglas M. Crockett, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1581 days.

(21) Appl. No.: 11/256,345

(22) Filed: Oct. 20, 2005

(65) Prior Publication Data

US 2007/0094409 A1   Apr. 26, 2007

(51) Int. Cl.
*G06F 15/16* (2006.01)
*H04L 12/28* (2006.01)
*H04J 3/24* (2006.01)
*H04M 11/00* (2006.01)
*H04W 4/00* (2009.01)
*H04L 12/24* (2006.01)

(52) U.S. Cl.
CPC ................... *H04L 41/0213* (2013.01)
USPC ........... 709/233; 370/230; 370/389; 370/473; 455/403; 455/466

(58) Field of Classification Search
USPC .......... 709/233; 370/229, 230–235, 349, 352, 370/412–417, 493, 506, 516, 556, 394, 395, 370/395.5, 395.64, 396, 473, 389; 375/240.12; 455/403, 466
See application file for complete search history.

(56) References Cited

U.S. PATENT DOCUMENTS

| | | | | |
|---|---|---|---|---|
| 6,975,621 | B2 * | 12/2005 | Deshpande et al. | 370/352 |
| 7,124,180 | B1 * | 10/2006 | Ranous | 709/224 |
| 2003/0091047 | A1 * | 5/2003 | Pate et al. | 370/392 |
| 2003/0156580 | A1 * | 8/2003 | Abraham et al. | 370/389 |
| 2003/0204390 | A1 * | 10/2003 | Bizzarri et al. | 703/21 |
| 2004/0075581 | A1 | 4/2004 | Staniszewski | |
| 2004/0125747 | A1 * | 7/2004 | Samadi et al. | 370/230 |
| 2004/0264454 | A1 * | 12/2004 | Rajkumar et al. | 370/389 |
| 2005/0122960 | A1 * | 6/2005 | Khan | 370/352 |
| 2005/0201414 | A1 | 9/2005 | Awais | |
| 2013/0121349 | A1 | 5/2013 | Crockett et al. | |

FOREIGN PATENT DOCUMENTS

| | | |
|---|---|---|
| EP | 0876072 | 11/1998 |
| JP | 2001223748 A | 8/2001 |
| JP | 2006521040 A | 9/2006 |
| TW | 530501 B | 5/2003 |

(Continued)

OTHER PUBLICATIONS

International Search Report and Written Opinion—PCT/US2006/060131, International Search Authority—European Patent Office—Mar. 28, 2007.

(Continued)

*Primary Examiner* — Peter Shaw
(74) *Attorney, Agent, or Firm* — Raphael Freiwirth

(57) ABSTRACT

An apparatus and method for adaptively bundling media frames in a data packet for transmission in a wireless data network. When a wireless device is ready to transmit an audio communication, a message is sent from the wireless device to a communication server that checks for network usage conditions and adaptively determines a bundling factor for the audio communication. The bundling factor is transmitted to the wireless device, and the wireless device bundles media frames into a data packet according to the bundling factor.

24 Claims, 6 Drawing Sheets

(56) References Cited

FOREIGN PATENT DOCUMENTS

| | | |
|---|---|---|
| TW | 546973 B | 8/2003 |
| TW | I240516 | 9/2005 |
| TW | I256848 | 6/2006 |
| WO | WO2004075581 | 9/2004 |
| WO | 2005009103 | 2/2005 |
| WO | WO2005076534 A1 | 8/2005 |

OTHER PUBLICATIONS

Taiwan Search Report—TW095138843—TIPO—Jul. 6, 2011.
European Search Report—EP12182473—Search Authority—Hague—Oct. 30, 2012.
European Search Report—EP12182465—Search Authority—The Hague—Nov. 28, 2012.

\* cited by examiner

SYSTEM AND METHOD FOR ADAPTIVE MEDIA BUNDLING FOR VOICE OVER INTERNET PROTOCOL APPLICATIONS

BACKGROUND OF THE INVENTION

1. Field of the Invention

The present invention generally relates to wireless telecommunications, and more specifically, relates to a system and method for adaptively increasing the efficiency of audio data transmission over a communication network.

2. Description of the Related Art

Technology advancement has made mobile telephones or wireless communications devices inexpensive and accordingly ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a handset, uses one single frequency for both upward and downward communications with a remote PTT server, while in a normal wireless communication a wireless telephone uses two frequencies for communicating with the PTT server, one for outgoing and one for incoming communications. The PTT system requires the person who is speaking to press a PTT button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server by informing the server it is ready to transmit. The remote PTT server verifies that no other party is using the communication channel and the channel is available then assigns the channel to the user. The user's message is received by the server and the server sends the message for each and every receiving party. After the message is transmitted to every receiving party, the channel is released and ready for use by other parties.

During the process described above, the audio from one user is sampled and digitized by a device, such as vocoder, at the handset. The digitized data is then assembled into frames and the frames are packed into data packets and transmitted over the air to the server. The server receives the data packets and sends them to their destinations. At their destination, the digitized data are extracted from the data packets, reassembled into audio streams, and played to the receiving party. In each data packet there may be one or more frames. Usually, the number of frames is set by the network standards or network service providers, and is independent of network conditions.

The network efficiency is increased when more frames are packed into a single data packet, and the efficiency is at its lowest when there is only one frame per data packet. However, incrementing the number of the frames per data packet also increases the delay at the user's handset. The handset has to wait for audio data from the user, assemble the audio data into multiple frames, and pack the multiple frames into one data packet before transmitting the data packet to the server.

Therefore, it is desirous to have an apparatus and method that enables a server to adaptively bundle different number of frames into a single data packet, such that the network efficiency is increased and it is to such apparatus and method the present invention is primarily directed.

SUMMARY OF THE INVENTION

Briefly described, the invention is the apparatus and method that adaptively bundles media frames in a data packet for transmission in a data network. When a wireless device is ready to transmit an audio communication, a message is sent from the wireless device to a communication server. The communication server then checks for network usage conditions and adaptively determines a bundling factor for the audio communication. The bundling factor is transmitted to the wireless device, and the wireless device bundles media frames into a data packet according to the bundling factor.

In one embodiment, the method determines a media bundling factor for adaptively bundling media frames in a data packet transmitted between a communication server and a user device during a communication in a data communication network. The method includes the steps of receiving at the communication server an audio transmission request from the user device, checking at least one network usage parameter from the data communication network, determining a media bundling factor that specifies the number of media frames bundled in one data packet according to the at least one network usage parameter, and transmitting from the communication server the media bundling factor along with a control message to the user device, wherein the user device adaptively bundles media frames according to the media bundling factor.

In another embodiment, the method determines a media bundling factor for adaptively bundling media frames in a data packet transmitted between a communication server and a user device during a communication in a data communication network. The method includes the steps of transmitting from the user device an audio transmission request to the communication server, receiving at the user device a media bundling factor along with a control message from the communication server, and checking a user device factor to select an actual bundling factor. The actual bundling factor specifies the number of media frames bundled in one data packet and the user device factor has at least a true state and a false state. If the user device factor is true, then the media bundling factor is used as the actual bundling factor; if the user device factor is false, then a predefined bundling factor is used as the actual bundling factor. The method further includes the steps of bundling media frames into a data packet according to the actual bundling factor, and transmitting the data packet with the bundled media frames from the user device to the communication server.

In yet another embodiment, the user device is capable of communicating with a remote communication server through a wireless network. When the user device is ready to transmit an audio communication to the communication server, the user device checks at least one internal factor, determines a media bundling factor for adaptively bundling media frames of the audio communication into a data packet transmitted between the user device and the communication server, and bundles the media frames into a data packet according to the media bundling factor.

In yet another embodiment, a communication server is provided as capable of determining a media bundling factor for adaptively bundling media frames in a data packet transmitted between the communication server and a user device during a communication in a data communication network. The server, upon receiving an audio transmission request from the user device, checks at least one network usage parameter from the data communication network, determines a media bundling factor according to the at least one network usage parameter, wherein the media bundling factor specifies the number of the media frames in one data packet, and transmits the media bundling factor along with a control message to the user device such that the user device can adaptively bundle media frames according to the media bundling factor.

In yet another embodiment, the user device is capable of determining a media bundling factor for adaptively bundling media frames in a data packet transmitted between the user device and a communication server during a communication in a data communication network. The user device, when ready to transmit an audio transmission to the communication server, transmits from the user device an audio transmission request to the communication server, receives at the user device a media bundling factor along with a control message from the communication server, checks a user device factor to select an actual bundling factor. The actual bundling factor specifies the number of media frames bundled in one data packet, and the user device factor has at least a true state and a false state. If the user device factor is true, the media bundling factor is used as the actual bundling factor; if the user device factor is false, a predefined bundling factor is used as the actual bundling factor. The user device further bundles media frames into a data packet according to the actual bundling factor, and transmits the data packet with the bundled media frames from the user device to the communication server.

The present system and methods are therefore advantageous as they enable a wireless communication device to efficiently transmit data packets to a server during a PTT communication. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "user device," "PTT communication device," "handheld device," and "handset" are used interchangeably are used interchangeably. As used herein, the term "exemplary" only indicates that what is described in an example, and in no way is intended to indicate preference or otherwise limit the invention to the embodiment described. Further, like numerals refer to like elements throughout the several views, and the articles "a" and "the" includes plural references, unless otherwise specified in the description.

Figure 1:
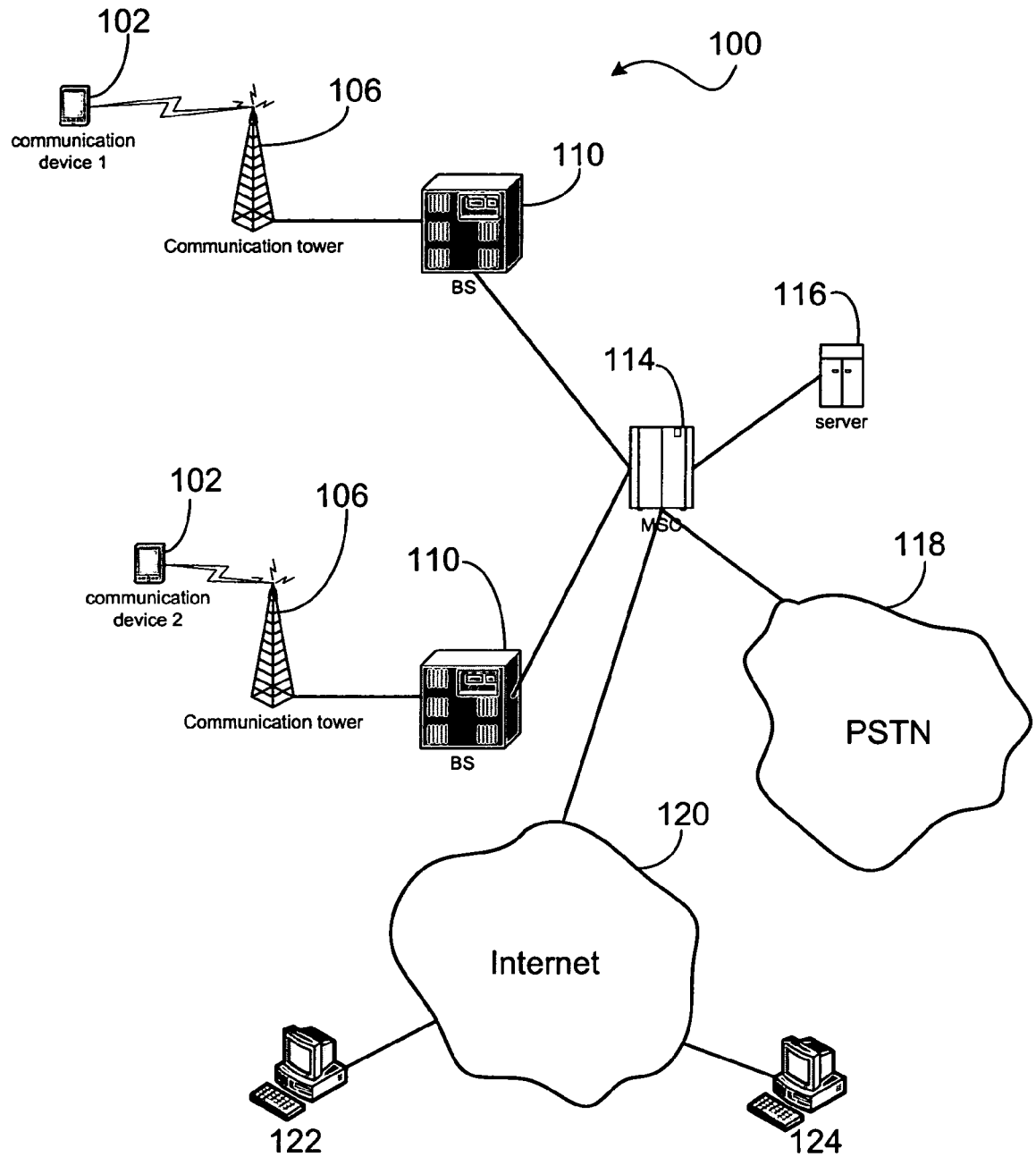
FIG. 1 depicts a prior art communication network.

In overview, the apparatus and method adaptively bundle media frames in a data packet for transmission over a data network. When a wireless device is ready to transmit an audio communication, a message is sent from the wireless device to a communication server. The communication server then checks for network usage conditions and adaptively determines a bundling factor for the audio communication. The bundling factor is transmitted to the wireless device, and the wireless device bundles media frames into a data packet according to the bundling factor. FIG. 1 depicts a prior art communication network 100. The communication network 100 includes one or more communication towers 106, each connected to a base station (BS) 110 and serving users with communication device 102 (also referred to herein interchangeably as a wireless device, user device, wireless user device, user wireless device, and wireless communication device). The communication device 102 can be cellular telephones, pagers, personal digital assistants (PDAs), laptop computers, or other hand-held, stationary, or portable communication devices that support push-to-talk (PTT) communications. The commands and data input by each user are transmitted as digital data to a communication tower 106. The communication between a user using a communication device 102 and the communication tower 106 can be based on different technologies, such code division multiple access (CDMA), time division multiple access (TDMA), frequency division multiple access (FDMA), the global system for mobile communications (GSM), or other protocols that may be used in a wireless communications network or a data communications network.

The PTT communications are digitized and placed into frames. The frames are transmitted through data packets over the communication network 100. The wireless communication device 102 sends and receives audio data packets on an assigned communication channel and control data are sent and received through a data channel. The data packets from each device is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. Optionally, the server 116 may be part of the MSC 114. The server 116 may also suppress transmission of PTT communication to a particular wireless device upon request from that device. The data packets are forwarded by the server 116 to the receiving wireless device 102 where an audio stream will be constructed based on the data in the data packets. In an alternative embodiment (not shown), the MSC 114 may not be needed in a data-only network. The data packets are sent by the BS 110 to a packet data serving node and/or other servers for processing. The data packets are transmitted between the wireless device 102 and the BS 106 according to a predefined protocol such as Real-time Transport Protocol (RTP), TCP/IP, user datagram protocol (UDP)/IP, or other suitable protocols.

An originating wireless device 102, when ready to engage in a PTT communication, sends a call message through the base station 110 to the server 116. The server 116 sends an announce message to the base station 110. The announce message is queued at the base station 110 until the targeted wireless device 102 is located. The base station 110 uses a page message to locate the targeted wireless device 102. After receiving a response from the targeted wireless device 102, the base station 110 delivers the announce message to the targeted wireless device 102. The targeted wireless device 102 acknowledges the announce message, and this acknowledgement message is forwarded by the base station 110 to the server 116. After confirming the targeted wireless device 102 is available, the server 116 sends a status message to the originating wireless device 102. The originating wireless device 102 can then start to transmit the PTT communication.

Figure 2:
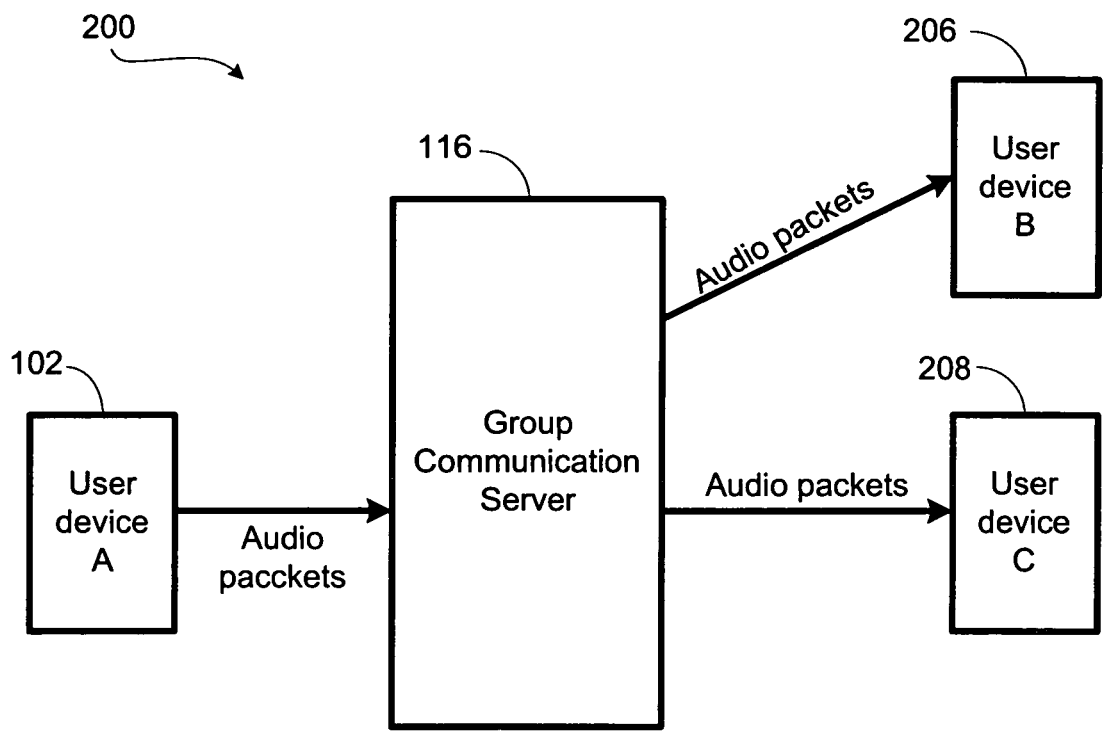
FIG. 2 is a simplified prior art communication diagram between a server and a wireless devices.

FIG. 2 is a simplified prior art diagram 200 representing interactions between the server (also known as group communication server) 116 and wireless devices 102, 206, 208 during a PTT communication process. The base stations 110 are omitted from FIG. 2. A communication does not occur between an initiating wireless device 102 and a server 116 until a user activates a PTT button. After the user activates the PTT feature, the wireless device 102 sends a message to the server 116 indicating it is ready to transmit a PTT message. Upon receiving the message from the wireless device 102, the server 116 determines the target wireless devices 206, 208 to which the PTT communication is directed and pages the wireless devices 206, 208.

Figure 3:
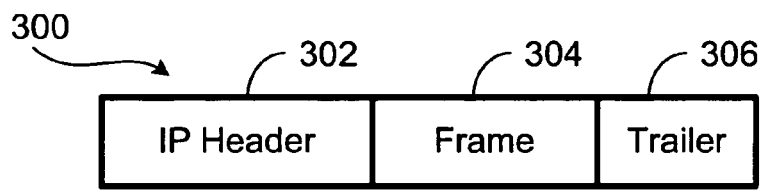
FIG. 3 is a prior art data packet with a single frame.

The PTT communication from the wireless device 102 to the server 116, is broadcasted to the target wireless device 206, 208 and digitized by a vocoder and put in frames. A PTT communication may be put into one frame or split into multiple frames. Frames are put into data packets and sent to its destination. FIG. 3 illustrates a prior art data packet 300. The data packet 300 has generally three parts: header 302, body (payload) 304, and trailer 306. The packet header 302 usually includes a start flag or a set of framing bits, control information (frame numbers), and address information. The payload 304 includes frames with the data being transported. The trailer 306 includes data bits used to error detection and correction and an end flag.

Figure 4:
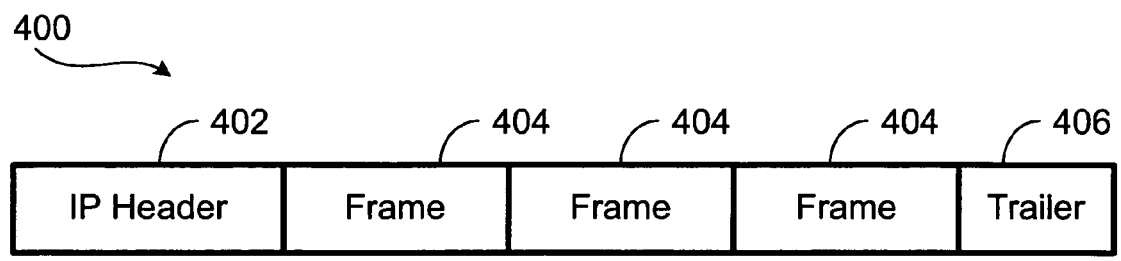
FIG. 4 is a prior art data packet with multiple frames.

When a data packet is transported through a network, its header and trailer are processed by each server along its path. The network efficiency is increased when more frames are placed into a single data packet as shown in FIG. 4. The prior art data packet 400 includes one header 402, multiple frames 404, and one trailer 406. Because more data are transported through the multiple frames 404 while the size of the header 402 and trailer 406 remain fairly constant, the data transfer rate is increased.

However, the increase of the number of frames per data packet also increase the latency of data transfer since a data packet will not be sent until multiple frames of data are assembled. The processing of data and packaging multiple frames causes a delay that might be noticeable to users.

There is provided a method to dynamically set a bundling factor for bundling frames into a data packet. The bundling factor is set according to network conditions and usage. The bundling factor is generally set by the server 116 after considering many different factors, such as the number of active users on line, the current network load, etc. The bundling factor is communicated to the user wireless device 102 and the user wireless device 102 then bundles frames into a data packet according to the bundling factor. Alternatively, the user wireless device 102 may override the bundling factor received from the server 116 with its own internal bundling factor if certain conditions are met.

Figure 5:
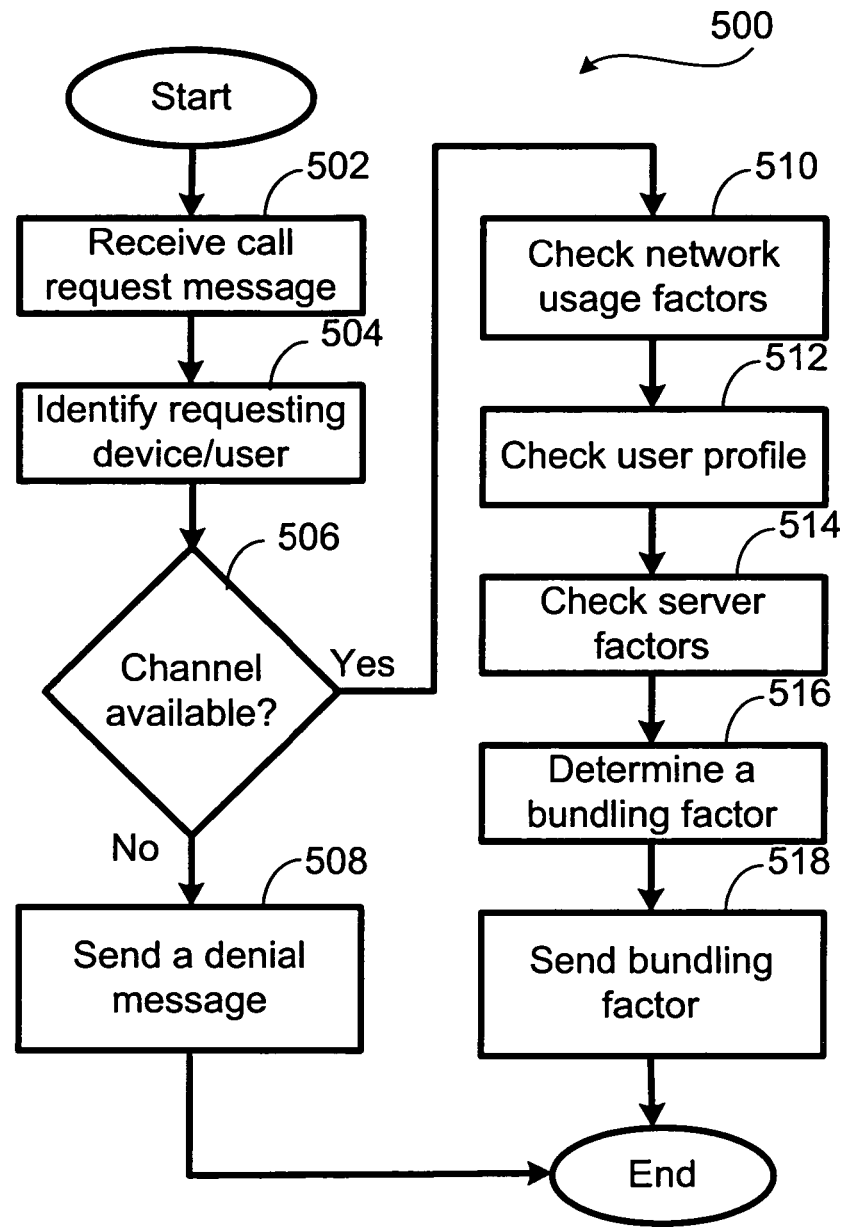
FIG. 5 is a flow chart illustrating an exemplary embodiment of a server process for determining a bundling factor.

FIG. 5 is a flow chart illustrating a server process 500. The server 116 receives a call request message from a user wireless device 102, step 502, after the user activates a PTT button. The server 116 identifies the requesting device, step 504, and checks whether a communication channel is available, step 506. If a communication channel is not available, the server 116 sends a denial message to the user wireless device 102, step 508. If the communication channel is available, the server 116 proceeds to check network usage factors, step 510. The network usage factor can include, as way of example and not limited to, traffic volume, time of day, number of users in one region, and measured packet delay variation of the media stream. The network usage factor can be received from a network traffic server, such as a MSC 114 or a network switch (not shown), or otherwise received by the server 116. The server 116 also checks the user profile, step 512, and server factors, step 514. The user profile can determine the quality of service to which the user has subscribed, or that has been assigned to the particular call. If the user is a fireman or a police officer, the bundling factor may be set low, so a higher quality of service can be delivered to the emergency communication. The quality of service may be affected by the bundling of data packets. The server factors can include, as way of example and not limited to, the number of registered users on line, the number of active users on the PTT communication, traffic volume on the server, and whether the call is an initial or subsequent talk segment for a given call. When the call is the initial talk segment between the parties, there is a delay to set up a communication channel for the communication. Therefore, the bundling factor should be set low to minimize additional delay caused by sampling and digitizing of the audio communication. For the subsequent talk segments, the communication channel has already been set up; therefore, the bundling factors can be set higher and additional delay may not be noticeable to the users.

After checking the network usage factors, user profile, and server factors, the server 116 determines a bundling factor for the communication, step 516, and sends the bundling factor to the requesting wireless user device 102, step 518. The bundling factor may be sent with a channel message or other control messages to the requesting wireless user device 102. The server 116 may also opt for not sending any bundling factor to the user device 102 if there is no overriding condition and the user device 102 can continue to send data packets as it did before.

Figure 6:
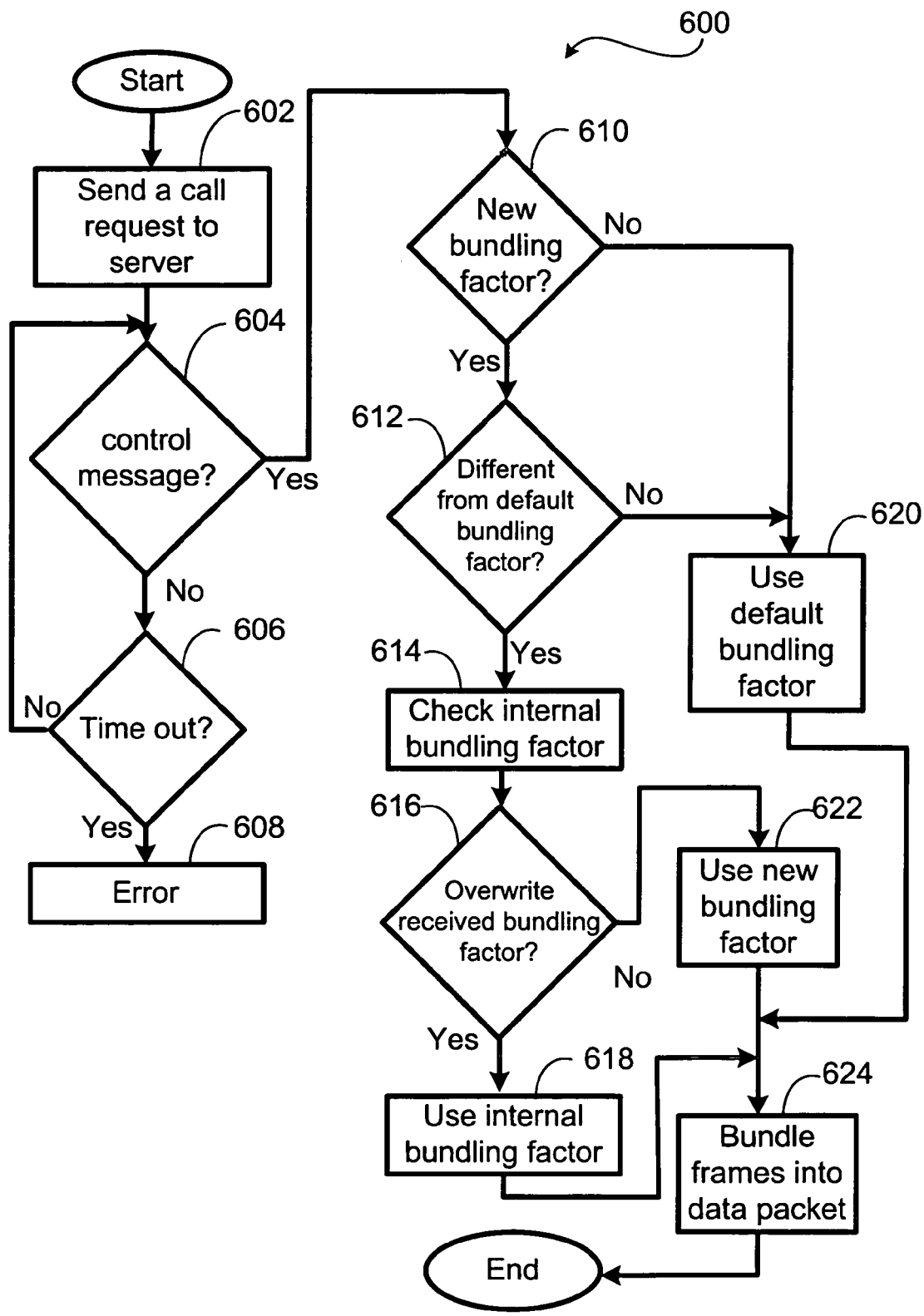
FIG. 6 is a flow chart illustrating an exemplary embodiment of a user device process for determining a bundling factor.

FIG. 6 is a flow chart for a user device process 600. After a user activates the PTT button, the originating wireless device (user device) 102 sends a call request message, step 602, through wireless communication to the server 116 and awaits for a control message from the server 116, step 604. The control message may be a channel grant message or any other control messages sent from the server 116 to the user device 102. If the control message is not received from the server 116 within a predefined period, a time out will occur and an error condition is generated, step 608. After the control message is received, the user device 102 checks whether it includes a bundling factor, step 610. If the control message does not include any bundling factor, the user device 102 uses its default bundling factor, step 620, and bundles the frames into data packets according to the bundling factor, step 624. The default bundling factor may be one or any number that was set previously.

If a new bundling factor is included in the control message, the user device 102 checks whether it is different from the default bundling factor, step 612. If the received bundling factor is the same as the default bundling factor, then the default bundling factor is used, step 620. If the received bundling factor is different from the default bundling factor, the user device 102 checks its internal bundling factor, step 614. The user device 102 may have an internal bundling factor that is set according to the user device's unique internal operating condition. The user device 102 then checks whether the internal bundling factor should override the received bundling factor, step 616. The user device 102 may consider many factors, such as its computing power and memory size, in deciding whether to override the received bundling factor.

If the user device's internal operating condition justifies, the user device 102 will use its internal bundling factor in lieu of the received bundling factor, step 618, as the actual bundling factor to bundle the frames into data packets, step 624. If the user device internal operating condition is not present, then the user device 102 uses the new bundling factor received from the server 116, step 622, as the actual bundling factor to bundling the frames into data packets, step 624.

Figure 7:
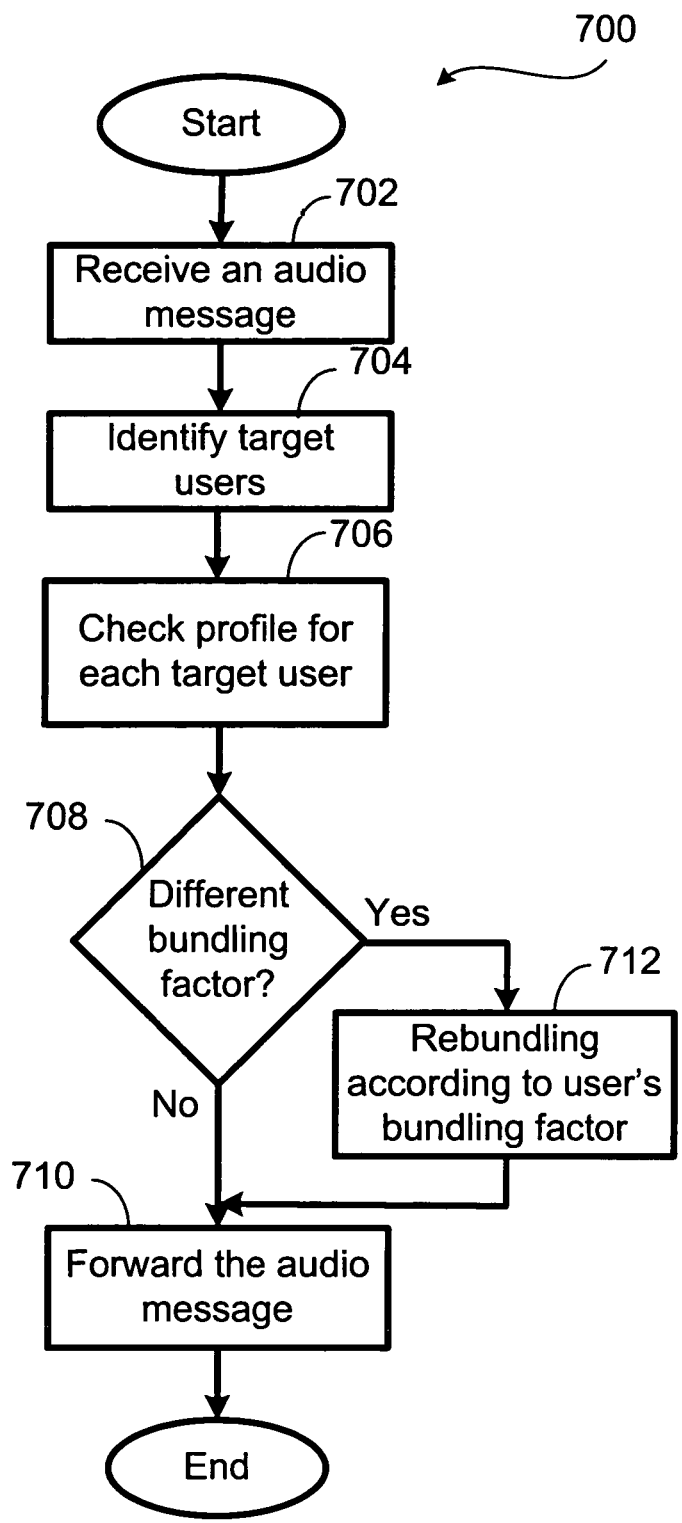
FIG. 7 is a flow chart illustrating an exemplary embodiment of a server forwarding an incoming audio message to a plurality of target users.

FIG. 7 illustrates a flow chart for a server process 700 that forwards audio messages received from a user device 102 to a plurality of target user devices 102. The server 116 receives an audio message (data packets relating to an audio message), step 702, and identifies the targeted users, step 704. After identifying the targeted users, the server 116 checks the profiles of each targeted user to learn the special bundling factor for the user, step 706. Each user may set a special bundling factor according to the properties and characteristics of his user device or his preference. Each user may have a user device that has different bundling requirements/capabilities when transmitting and receiving media files. The server 116 then check if the special bundling factor is different from what has been used for the received data packet, step 708. If the special bundling factor is the same as the one used for the incoming data packet, the server 116 forwards the data packet to the user, step 710. If the special bundling factor is different from the one used for the incoming data packet, then the server 116 retrieves the frames from the incoming data packets and re-bundles the frames into new data packets according to the special bundling factor for the user, step 712. The server 116 is capable of forwarding the incoming data packets to their multiple destinations with different a bundling factor for each destination.

The ability for the server 116 to independently bundle a received data packet with different bundling factors depending on the destinations of the received data packet is important because this allows the server 116 to bridge networks that treat media data differently. The ability for a media server to adaptively bundle media frames into data packets is an important enabling capability for certain interoperability use cases.

The following is a use scenario description. When a user wants to communicate with members of his PTT communication group, he presses a PTT button on his user device and a call request message is sent from his user device to a PTT communication server. The PTT server receives the call request message and verifies that a channel is available for the user device. Before granting the "floor" to the user device, the PTT server checks the user profile to learn whether the user has subscribed to a high quality PTT communication. The PTT server also checks whether the message is for an initial talk segment. If the request is an initial talk segment, the PTT server needs to set up a communication channel between the user and other receiving members. The PTT server further checks how many active members are being served by the PTT server and the current condition of the network traffic volume. After checking all the pertinent factors, the PTT server sets a low bundling factor for the communication since the request is for an initial talk segment and the traffic volume is relatively low. The bundling factor is then sent to the requesting user device 102 along with a control message.

The user device 102 receives the control message and checks whether there is any bundling factor attached. After retrieving the bundling factor from the control message, the user device 102 checks its own internal bundling factor and the default bundling factor. Alternatively, the default bundling factor may be a bundling factor used in the last communication. After checking its operating condition, the user device 102 decides not to override the received bundling factor and uses it to bundle the frames with digitized audio data into the data packets. For subsequent audio transmissions, the server may set the bundling factor to a higher value if the network traffic volume increases or the server loads increase. When the bundling factor is higher, there will be more payload data transferred per header.

In an alternative embodiment, the user device 102 can send a message with a preferred bundling factor to the server 116, wherein the preferred bundling factor will be used with communications involving the user device 102. This allows the user device 102 to set the preferred bundling factor at the server 116. This preferred bundling factor may be stored in the user profile, which is checked by the server 116 before determining a bundling factor for the communication that involves the user device 102. The preferred bundling factor may be determined by the physical characteristics of the user device 102.

In yet another alternative embodiment, the user device 102 may set a bundling factor by checking its internal information without any suggestion or influence from the network or from the server 116. The user device 102 may check a user preference or user profile stored in the user device 102. The user device 102 may also select the bundling factor based on a call priority assigned to the call. The ability for each user device 102 to set up its own bundling factor independent from any input from a server enables direct, end-to-end communications between two user devices.

Although the description above is based on the wireless transmission of a PTT communication, the invention is equally applicable non-PTT communications, such as data transfer between two computing devices 122 and 124 illustrated in FIG. 1. The two computing devices 122 and 124 may be maintaining an audio communication over the Internet (VoIP applications). The bundling factor may be set by a network server taking in consideration the traffic volume and other factors of the data communication network 120 connecting the two computing devices 122 and 124. Alternatively, two computing devices 122 and 124 may be able to determine the bundling factor as described above, thus allowing a direct communication, without assistance of a server, between the two computing devices 122 and 124.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-7, the steps illustrated do not require or imply any particular order of actions. The actions may be executed in sequence or in parallel. The method may be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for determining a media bundling factor for adaptively bundling media frames in a data packet transmitted between a communication server and a user device during a communication in a data communication network, comprising:
   receiving, via a data channel, at the communication server, an audio transmission request from the user device;
   checking at least one network usage parameter from the data communication network, wherein the at least one network usage parameter comprises a measured packet delay variation of data packets transmitted between the communication server and the user device;
   checking a user profile of the user device for a user device-specific bundling factor corresponding to a user device factor that defines an internal operating condition or a user-specific characteristic corresponding to the user device, wherein the user device-specific bundling factor is respectively set according to the internal operating condition or the user-specific characteristic corresponding to the user device;
   determining a media bundling factor for a communication channel according to the at least one network usage parameter when there is no user device-specific bundling factor or according to the user device-specific bundling factor, wherein the media bundling factor specifies a number of media frames bundled in one data packet; and
   transmitting from the communication server on the data channel, the media bundling factor for the communication channel along with a control message to the user device, wherein the user device adaptively bundles media frames for the communication channel according to the media bundling factor.

2. The method of claim 1, wherein the at least one network usage parameter further comprises a total number of users registered with the communication server for the communication.

3. The method of claim 1, wherein the at least one network usage parameter further comprises a number of active participants in the communication.

4. The method of claim 1, wherein the at least one network usage parameter further comprises system usage.

5. The method of claim 1, wherein the at least one network usage parameter further comprises a network condition.

6. The method of claim 1, wherein the at least one network usage parameter further comprises a priority level assigned to the user device.

7. The method of claim 1, wherein the at least one network usage parameter further comprises a priority level assigned to the audio transmission request.

8. The method of claim 1, further comprising receiving a first message from a network server, wherein the first message determines the media bundling factor.

9. The method of claim 1, further comprising receiving a second message from the user device, wherein the second message determines the media bundling factor.

10. The method of claim 1, further comprising checking at least one server factor corresponding to the communication server, and wherein the media bundling factor is further determined based on considering a combination of the at least one network usage parameter, the user device-specific bundling factor, and the at least one server factor.

11. The method of claim 1, wherein user device factor comprises a quality of service of a subscription or a quality of service assigned to the communication.

12. The method of claim 1, wherein user device factor comprises at least one of a computing power or a memory size.

13. A communication server capable of determining a media bundling factor for adaptively bundling media frames in a data packet transmitted between the communication server and a user device during a communication in a data communication network, wherein the communication server, upon receiving an audio transmission request over a data channel from the user device,
   checks at least one network usage parameter from the data communication network, wherein the at least one network usage parameter comprises a measured packet delay variation of data packets transmitted between the communication server and the user device;
   checks a user profile of the user device for a user device-specific bundling factor corresponding to a user device factor that defines an internal operating condition or a user-specific characteristic corresponding to the user device, wherein the user device-specific bundling factor is respectively set according to the internal operating condition or the user-specific characteristic corresponding to the user device;
   determines a media bundling factor for a communication channel according to the at least one network usage parameter when there is no user device-specific bundling factor or according to the user device-specific bundling factor, wherein the media bundling factor specifies a number of the media frames in one data packet on the communication channel; and
   transmits via the data channel the media bundling factor along with a control message to the user device such that the user device can adaptively bundles media frames according to the media bundling factor.

14. The communication server of claim 13, wherein the communication server further receives a first message from a network server, wherein the first message determines the media bundling factor.

15. The communication server of claim 13, wherein the communication server further receives a second message from the user device, wherein the second message determines the media bundling factor.

16. The communication server of claim 13, wherein the communication server further checks at least one server factor corresponding to the communication server, and wherein the media bundling factor is further determined based on considering a combination of the at least one network usage parameter, the user device-specific bundling factor, and the at least one server factor.

17. The user device of claim 13, wherein user device factor comprises a quality of service of a subscription or a quality of service assigned to the communication.

18. The user device of claim 13, wherein user device factor comprises at least one of a computing power or a memory size.

19. A non transitory computer-readable medium on which is stored a computer program for determining a media bundling factor for adaptively bundling media frames in a data packet transmitted between a communication server and a user device during a communication in a data communication network, the computer program comprising computer instructions that when executed by a communication server performs the steps of:
- receiving via a data channel at the communication server an audio transmission request from the user device;
- checking at least one network usage parameter from the data communication network, wherein the at least one network usage parameter comprises a measured packet delay variation of data packets transmitted between the communication server and the user device;
- checking a user profile of the user device for a user device-specific bundling factor corresponding to a user device factor that defines an internal operating condition or a user-specific characteristic corresponding to the user device, wherein the user device-specific bundling factor is respectively set according to the internal operating condition or the user-specific characteristic corresponding to the user device;
- determining a media bundling factor for a communication channel according to the at least one network usage parameter when there is no user device-specific bundling factor or according to the user device-specific bundling factor, wherein the media bundling factor specifies a number of the media frames in one data packet; and
- transmitting over the data channel from the communication server the media bundling factor along with a control message to the user device, wherein the user device can adaptively bundle media frames on the communication channel according to the media bundling factor.

20. The non transitory computer-readable medium of claim 19, further comprising instructions executable for checking at least one server factor corresponding to the communication server, and for determining the media bundling factor based on considering a combination of the at least one network usage parameter, the user device-specific bundling factor, and the at least one server factor.

21. The non transitory computer-readable medium of claim 19, wherein user device factor comprises a quality of service of a subscription or a quality of service assigned to the communication.

22. A communication server capable of determining a media bundling factor for adaptively bundling media frames in a data packet transmitted between the communication server and a user device during a communication in a data communication network, the communication server comprising:
- means for checking at least one network usage parameter from the data communication network, wherein the at least one network usage parameter comprises a measured packet delay variation of data packets transmitted between the communication server and the user device;
- means for checking a user profile of the user device for a user device-specific bundling factor corresponding to a user device factor that defines an internal operating condition or a user-specific characteristic corresponding to the user device, wherein the user device-specific bundling factor is respectively set according to the internal operating condition or the user-specific characteristic corresponding to the user device;
- means for determining a media bundling factor according to the at least one network usage parameter when there is no user device-specific bundling factor or according to the user device-specific bundling factor, wherein the media bundling factor specifies a number of the media frames in one data packet; and
- means for transmitting over a data channel the media bundling factor along with a control message to the user device such that the user device can adaptively bundle media frames over a communication channel according to the media bundling factor.

23. The communication server of claim 22, further comprising means for receiving a first message from a network server, wherein the first message determines the media bundling factor.

24. The communication server of claim 22, further comprising means for receiving a second message from the user device, wherein the second message determines the media bundling factor.

* * * * *